United States Patent [19]
Kaste et al.

[11] Patent Number: 5,777,777
[45] Date of Patent: Jul. 7, 1998

[54] LINEARIZATION CIRCUIT DEVICE

[75] Inventors: Norbert Kaste; Reinhard Wegener, both of Berlin, Germany

[73] Assignee: Robert Bosch GmbH, Stuttgart, Germany

[21] Appl. No.: 761,471

[22] Filed: Dec. 6, 1996

[30] Foreign Application Priority Data

Dec. 6, 1995 [DE] Germany ............... 195 45 435.9

[51] Int. Cl.[6] .................... G02F 1/03; G02F 1/035
[52] U.S. Cl. ............................ 359/245; 385/2
[58] Field of Search .................. 359/237, 245; 385/2, 3

[56] References Cited

U.S. PATENT DOCUMENTS

| | | | |
|---|---|---|---|
| 5,074,631 | 12/1991 | Hamano et al. | 385/3 |
| 5,239,401 | 8/1993 | Olshansky | 359/188 |
| 5,282,072 | 1/1994 | Nazarathy et al. | |
| 5,363,230 | 11/1994 | Djupsjobacka | 359/182 |
| 5,644,665 | 7/1997 | Burns et al. | 385/3 |

FOREIGN PATENT DOCUMENTS

WO 94/02998  2/1994  WIPO.

*Primary Examiner*—Mark Hellner
*Attorney, Agent, or Firm*—Kenyon & Kenyon

[57] ABSTRACT

A linearization circuit device for an electro-optical modulator where an electrical modulation signal is divided by an anti-phase dividing element and is distorted by two distortion elements. The electro-optical modulator has two differential inputs which receive the individual signals.

9 Claims, 1 Drawing Sheet

LINEARIZATION CIRCUIT DEVICE

FIELD OF THE INVENTION

The present invention is directed to a linearization circuit device for an electro-optical modulator.

BACKGROUND INFORMATION

International Application No. WO 94/02998 describes linearizing an external modulator of a laser with respect to its characteristic curve by connecting a linearization circuit device in the incoming circuit. For this purpose, the linearization circuit device has a predistortion element, whose transfer function is the inverse function of the transfer function of the external modulator.

U.S. Pat. No. 5,282,072 describes another linearization circuit device for an electro-optical modulator, where the linearization circuit device is devised as a push-pull amplifier configuration to provide the external modulator with a high enough driving amplitude and a low share of unwanted distortions. The described linearization circuit device has an anti-phase dividing element (or also 180° hybrid), which divides the modulation signal into two individual signals and effects a phase difference in the two individual signals of 180°. The two individual signals are each fed to a predistortion element and are then amplified. The two predistorted and amplified individual signals arrive, in turn, at a 180° hybrid, which serves as a coupling element. The output signal of the coupling element is fed to the electro-optical modulator.

SUMMARY OF THE INVENTION

In contrast, the linearization circuit device of the present invention offers the advantage of eliminating the need for at least one of the 180° hybrids. Since such 180° hybrids contain broadband HF transformers, which always produce amplitude and phase-response errors, their influence in the signal path between the linearization circuit device and the electro-optical modulator is especially high. Therefore, eliminating a 180° hybrid improves the amplitude and phase response and, thus, also the attainable linearity for the electro-optical modulator. Moreover, the necessary amplification of the predistorted individual signals is thereby reduced, so that the appropriate amplifier delivers a smaller intermodulation contribution to the individual signals. Finally, driving the electro-optical modulator in push-pull operation eliminates an unwanted phase modulation of the optical output signal (chirp), which improves the optical signal quality, in particular for long transmission distances.

The measure according to which the distortion element according to the present invention realizes a partial series expansion of the non-linearity function of the electro-optical modulator, represents another advantage. For example, through the series expansion, a discrete, mathematical approximation of the inverse function of the transfer function of the electro-optical modulator is able to be realized, whose order and, thus, depth of approximation is able to be adapted by the user of the linearization circuit device to the specific application case.

Selecting a lag element and/or a multiplier and a functional element for the distortion element offers the advantage of minimal outlay required to perform the approximation.

If both distortion elements are interconnected in a crosswise arrangement, where instead of a 180° hybrid, a power splitter element is provided, from which in each case one output is routed via a functional element of the other coupling element, then the number of necessary 180° hybrids or anti-phase dividing elements is minimized, so that the amplitude and phase-response errors are likewise minimized in the circuit. As a result, the circuit acquires a higher frequency band width, within which a high degree of linearity is attainable for the electro-optical modulator.

DETAILED DESCRIPTION OF THE INVENTION

Figure 1:
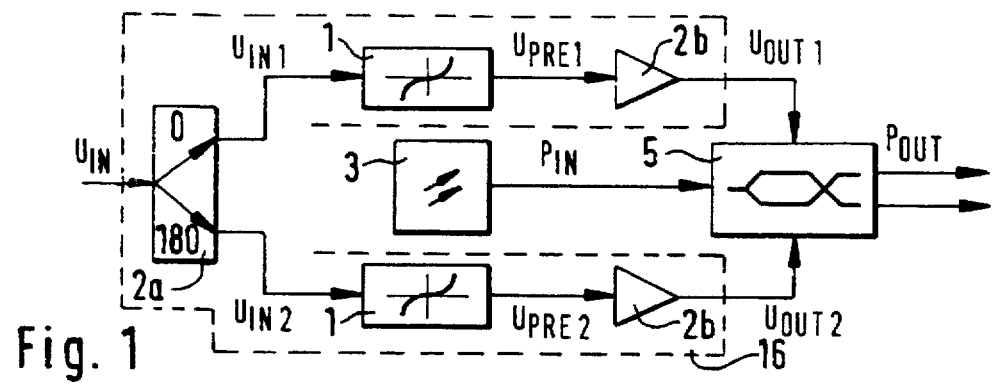
FIG. 1 depicts a first embodiment of a linearization circuit device according to the present invention having an electro-optical modulator with two differential inputs.

FIG. 1 depicts an optical source 3, which transmits an optical input signal $P_{IN}$ to the optical input of an electro-optical modulator 5. The electro-optical modulator 5 is designed, for example, as a Mach-Zehnder interferometer, whose detailed structure will be described in conjunction with FIG. 2. In addition, a linearization circuit device 16 is provided, which has an anti-phase dividing element $2a$ with one input and two outputs. Anti-phase dividing element $2a$ is also known as a 180° hybrid or as an anti-phase power splitter. An electrical modulation signal $U_{IN}$ is fed to the input of anti-phase dividing element $2a$. Anti-phase dividing element $2a$ has two outputs, which each lead to a distortion element 1. Connected to each distortion element 1 in the outgoing circuit is an amplifier $2b$, whose output is routed to electro-optical modulator 5.

The electro-optical modulation signal $U_{IN}$ is split by the anti-phase dividing element $2a$ into a first individual signal $U_{IN1}$ and a second individual signal $U_{IN2}$ that is phase displaced by 180° from said first signal. The individual signals $U_{IN1}$ and $U_{IN2}$ arrive at their respective distortion elements 1, which exhibit an arc-sinusoidal transfer function in this example. At the output of each distortion elements 1, predistorted individual signals $U_{PRE1}$ and $U_{PRE2}$, respectively, are adapted to be tapped off and are amplified in amplifiers $2b$. The amplified, predistorted individual signals $U_{OUT1}$ and $U_{OUT2}$ then arrive at electro-optical modulator 5. At its outputs, electro-optical modulator 5 supplies output signal $P_{OUT}$ as an optical output signal, which, as expressed by the formula $$P_{OUT} = P_{IN} \cdot (½ + ½ \sin(U_{OUT1} - U_{OUT2} / U_{PI})) \tag{1}$$

is dependent upon the effective control voltage ($U_{OUT1} - U_{OUT2}$). If this is an electro-optical modulator with two optical push-pull outputs, then one of the output signals of formula (1) follows, e.g., $$P_{OUT1} = P_{OUT} \tag{1a}$$

and the other output signal is always $$P_{OUT2} = P_{IN} - P_{OUT1} \tag{1b}.$$

Losses in the optical modulator have not been considered here.

In this case, $U_{PI}$ is the modulator constant. Amplifiers $2b$ effect an amplification of the incoming predistorted individual signals $U_{PRE1}$ and $U_{PRE2}$, respectively, as expressed by the formula $$U_{OUT}=G \cdot U_{PRE} \qquad (2),$$

G being the amplification of amplifier 2b. Since this is a push-pull arrangement, formula (1) is converted to:

$$P_{OUT}=P_{IN} \cdot (\tfrac{1}{2}+\tfrac{1}{2}\sin((U_{OUT1}-U_{OUT2})/U_{PI}))) \qquad (3).$$

The anti-phase dividing element 2a effects a splitting of the modulating input signal $U_{IN}$ into $$U_{IN1}=-U_{IN2}=K \cdot U_{IN} \qquad (4)$$

K being the transfer constant of the 180° hybrid 2a. When each of the two input signals $U_{IN1}$ and $U_{IN2}$ propagates through substantially identical, ideal distortion elements 1, predistorted signals $U_{PRE1}$ and $U_{PRE2}$ arise, respectively, as expressed by the formula $$U_{PRE1}=U_0 \cdot \arcsin(U_{IN1}/U_0)$$

$$U_{PRE2}=U_0 \cdot \arcsin(U_{IN2}/U_0)=U_{PRE1} \qquad (5).$$

Given an amplification of $$G=\tfrac{1}{2} U_P/U_0 \qquad (6)$$

one obtains from equation (2)

$$P_{OUT}=P_{IN} \cdot (\tfrac{1}{2}+\tfrac{1}{2}K \cdot U_{IN}/U_0) \qquad (7).$$

Thus, there is a linear correlation between the optical output signal $P_{OUT}$ and the electrical input signal $U_{IN}$.

Figure 2:
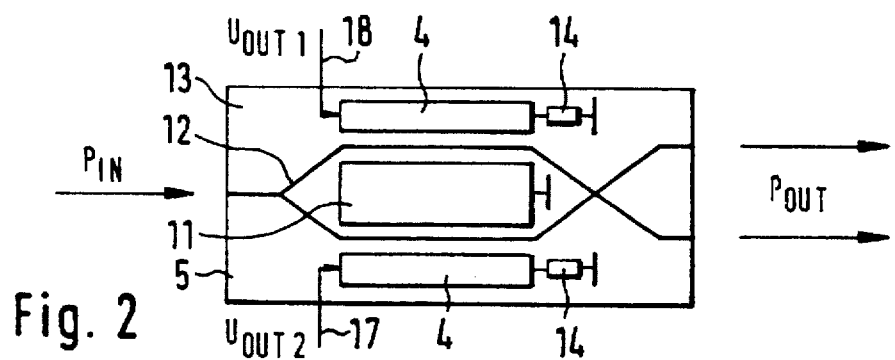
FIG. 2 depicts an electro-optical modulator having two differential inputs according to the present invention.

FIG. 2 illustrates an exemplary embodiment of the electro-optical modulator 5 in the form of a Mach-Zehnder interferometer having two differential inputs 17 and 18. A substrate 13 is provided, which supports an optical waveguide 12. Optical waveguide 12 emanates in a straight line from the input for the optical input signal $P_{IN}$ and then diverges into two equal, partial waveguides, which then continue to run in parallel to then converge again after a certain distance, cross over one another, then run in parallel again following the cross-over point, and form the outputs for the optical output signal $P_{OUT}$. A ground electrode 11 is installed in the parallel section of the partial optical waveguide between the diverging and the converging section.

On the sides opposing the ground electrode 11 with respect to the partial optical waveguides, a control electrode 4 is installed in each case, which is connected via a terminal resistor 14 to ground. The two control electrodes 4 have connections 17 and 18, respectively, which serve as the differential inputs for the amplified, predistorted individual signals $U_{OUT2}$ and $U_{OUT1}$, respectively. The described arrangement of control electrodes 4 and ground electrode 11 forms a difference in an optical way between the two amplified, predistorted individual signals $U_{OUT1}$ and $U_{OUT2}$. This eliminates the need for a 180° hybrid to unite the two predistorted, amplified individual signals $U_{OUT1}$ and $U_{OUT2}$. Of course, given the same functionality, it is possible for the design of modulator 5 to differ from that of the exemplary embodiment according to FIG. 2.

Figure 3:
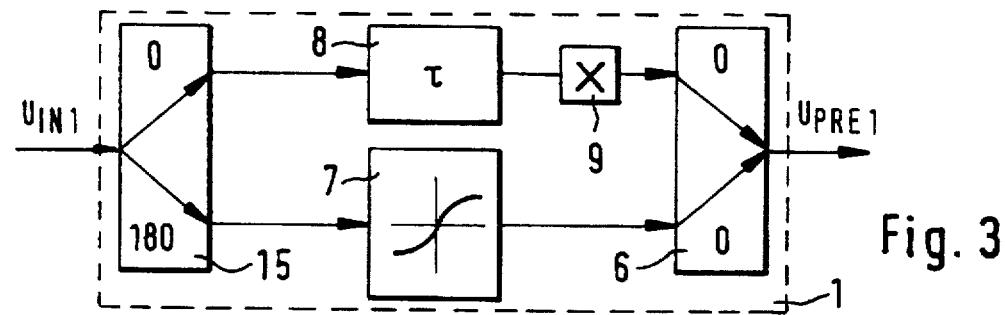
FIG. 3 depicts the design of a distortion element according to the present invention.

FIG. 3 illustrates an exemplary embodiment of distortion element 1. For this, distortion element 1 has another anti-phase dividing element 15, to whose one output is connected a lag element 8, and whose other output is routed via a functional element 7 to one of the inputs of a coupling element 6. Lag element 8 is linked via a multiplier 9 to the other input of coupling element 6. The electrical modulation signal $U_{IN1}$ is fed to the other anti-phase dividing element 15, and the predistorted individual signal $U_{PRE1}$ is adapted to be tapped off at the output of coupling element 6. An analog circuit is provided for distortion element 1 in the branch of the individual signal $U_{IN2}$ which is displaced by 180°.

Functional element 7 has a non-linear characteristic. Lag element 8 is used for compensating for the difference in propagation delay between functional element 7 and multiplier 9. In this case, multiplier 9 is not essential. Via coupling element 6, the two individual paths are joined together, thus yielding a total composite function, which is formed as an approximation of the non-linearity of electro-optical modulator 5. An example is if functional element 7 has a sinusoidal transfer function, so that, e.g., the dependency arises:

$$U_{PRE1}=U_{IN1}-\tfrac{1}{2}\sin(U_{IN1}) \qquad (8)$$

If electro-optical modulator 5 has a sinusoidal characteristic, it can then be achieved on the basis of the mathematical approximation formula $$\arcsin(x) \approx 2 \cdot x - \sin(x) \qquad (9)$$

that the non-linearity of electro-optical modulator 5 produces a linear correlation between the optical input signal $P_{IN}$ and the optical output signal $P_{OUT}$ because $$\arcsin(\sin(x))=x \qquad (10).$$

Other approximation algorithms are likewise provided by appropriately selecting functional element 7 or even by additionally bringing into the circuit other branches by means of anti-phase dividing elements and coupling elements to obtain a corresponding exact linearization.

Figure 4:
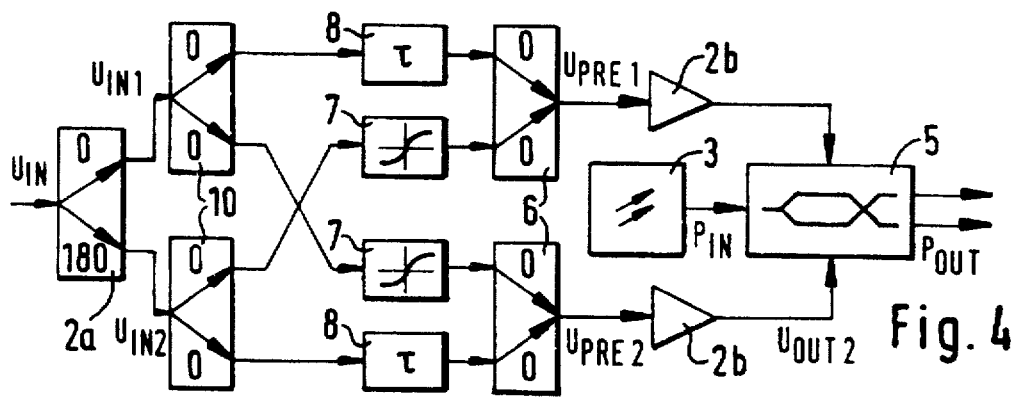
FIG. 4 depicts a second embodiment of a linearization circuit device according to the present invention having only one anti-phase dividing element.

FIG. 4 shows the circuit diagram of another exemplary embodiment which basically corresponds to FIG. 1, but has distortion element 1 inserted in accordance with FIG. 3. However, there is a decisive difference in that instead of the additional anti-phase dividing elements 15, merely power splitter elements 10 are provided, in each case one output of the two power splitter elements 10 being routed to cross the other, so that the signal belonging to the individual signal $U_{IN2}$ and to be supplied to functional element 7 is fed to the functional element 7 which is allocated to individual signal $U_{IN1}$, and vice versa. The input-side 180° hybrid 2a is used in this case to produce the anti-phase relation, both with respect to the push-pull driving of electro-optical modulator 5, as well as for the correct operation of functional elements 7. As a result, the entire circuit arrangement only needs one single anti-phase dividing element 2a.

What is claimed is:

1. A linearization circuit device for an electro-optical modulator, comprising:

an anti-phase dividing element, the anti-phase dividing element splitting an incoming electrical modulation signal into a first anti-phase signal and a second anti-phase signal; and first and second distortion elements coupled to the anti-phase dividing element, each of the first and second distortion elements receiving a respective one of the first and second anti-phase signals to generate a first distorted signal and a second distorted signal, respectively, the first and second distorted signals being applied to a differential input of the electro-optical modulator for modulating an optical input signal.

2. The linearization circuit device for an electro-optical modulator as defined in claim 1, wherein each of the first and second distortion elements implement a partial series expansion of an inverse function of a transfer function of the electro-optical modulator.

3. A linearization circuit device for an electro-optical modulator comprising:

an anti-phase dividing element, the anti-phase dividing element splitting an incoming electrical modulation signal into a first anti-phase signal and a second anti-phase signal; and first and second distortion elements coupled to the anti-phase dividing element, each of the first and second distortion elements receiving a respective one of the first and second anti-phase signals to generate a first distorted signal and a second distorted signal respectively, the first and second distorted signals being applied to a differential input of the electro-optical modulator for modulating an optical input signal;

wherein each of the first and second distortion elements implement a partial series expansion of an inverse function of a transfer function of the electro-optical modulator;

wherein each of the first and second distortion elements includes a coupling element having a first input, a second input and an output, the output providing one of the first distorted signal and the second distorted signal; and wherein each of the first and second distortion elements further includes an anti-phase dividing element having an input, a first output and a second output, the input receiving one of the first anti-phase signal and the second anti-phase signal, the first output being connected via a lag element to the first input of the coupling element, the second output being connected via a functional element to the second input of the coupling element.

4. The linearization circuit device for an electro-optical modulator as defined in claim 3, wherein the first output of the anti-phase dividing element is further connected to the first input of the coupling element via a multiplier element.

5. The linearization circuit device for an electro-optical modulator as defined in claim 1, wherein the first and second distortion elements include a Mach-Zehnder modulator.

6. The linearization circuit device for an electro-optical modulator as defined in claim 3, wherein the functional element includes a Mach-Zehnder modulator.

7. A linearization circuit device for an electro-optical modulator comprising:

an anti-phase dividing element, the anti-phase dividing element splitting an incoming electrical modulation signal into a first anti-phase signal and a second anti-phase signal; and first and second distortion elements coupled to the anti-phase dividing element, each of the first and second distortion elements receiving a respective one of the first and second anti-phase signals to generate a first distorted signal and a second distorted signal, respectively, the first and second distorted signals being applied to a differential input of the electro-optical modulator for modulating an optical input signal;

wherein each of the first and second distortion elements includes a coupling element having a first input, a second input and an output, the output providing one of the first distorted signal and the second distorted signal; and wherein each of the first and second distortion elements further includes a power splitter element having an input, a first output and a second output, the input receiving one of the first anti-phase signal and the second anti-phase signal, the first output being connected via a lag element to the first input of the coupling element associated with the first distortion element, and the second output being connected via a functional element to the second input of the coupling element associated with the second distortion element.

8. The linearization circuit device for an electro-optical modulator as defined in claim 7, wherein the functional element includes a Mach-Zehnder modulator.

9. The linearization circuit device for an electro-optical modulator as defined in claim 1, wherein the electro-optical modulator includes a Mach-Zehnder modulator.

* * * * *